S. M. LANGSTON.
MACHINE FOR MAKING CELLULAR BOARDS.
APPLICATION FILED NOV. 20, 1908.
929,451.
Patented July 27, 1909.
3 SHEETS—SHEET 1.
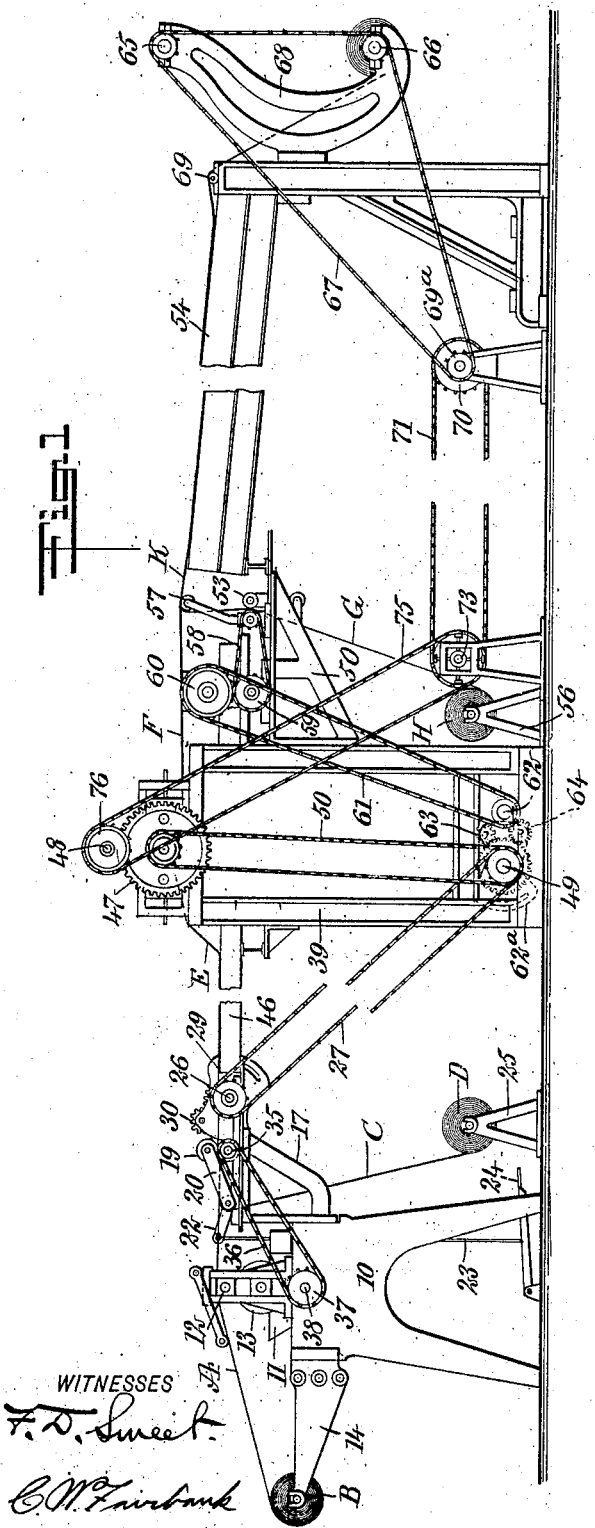
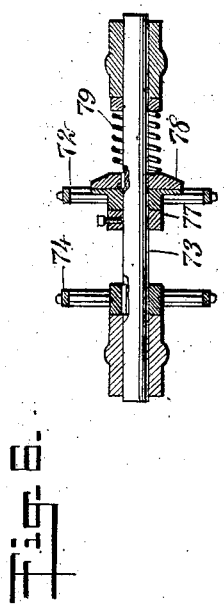
WITNESSES
INVENTOR
Samuel M. Langston
BY
ATTORNEYS S. M. LANGSTON.
MACHINE FOR MAKING CELLULAR BOARDS.
APPLICATION FILED NOV. 20, 1908.
929,451.
Patented July 27, 1909.
3 SHEETS—SHEET 2.
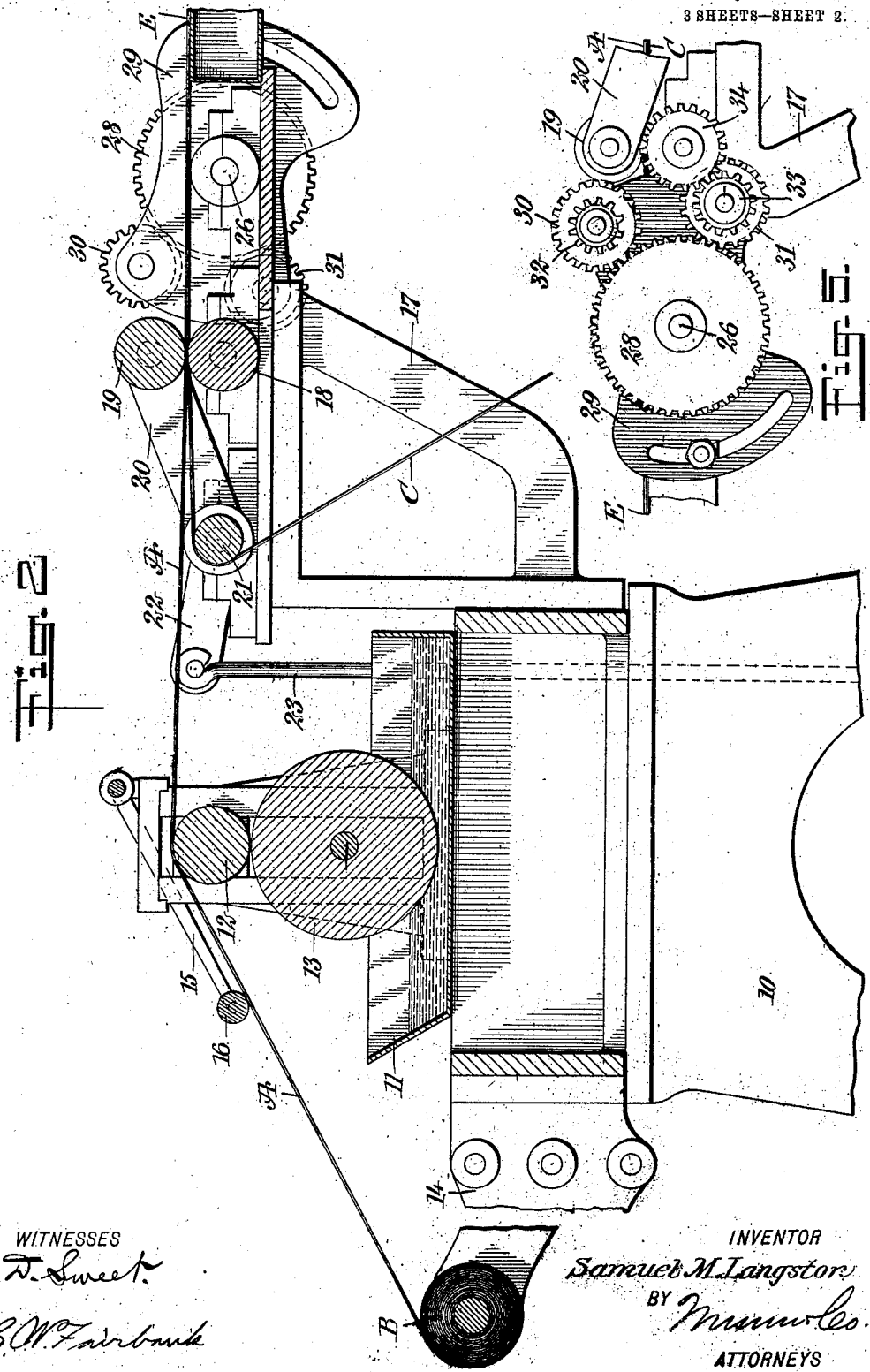
WITNESSES
INVENTOR
Samuel M. Langston
BY
ATTORNEYS

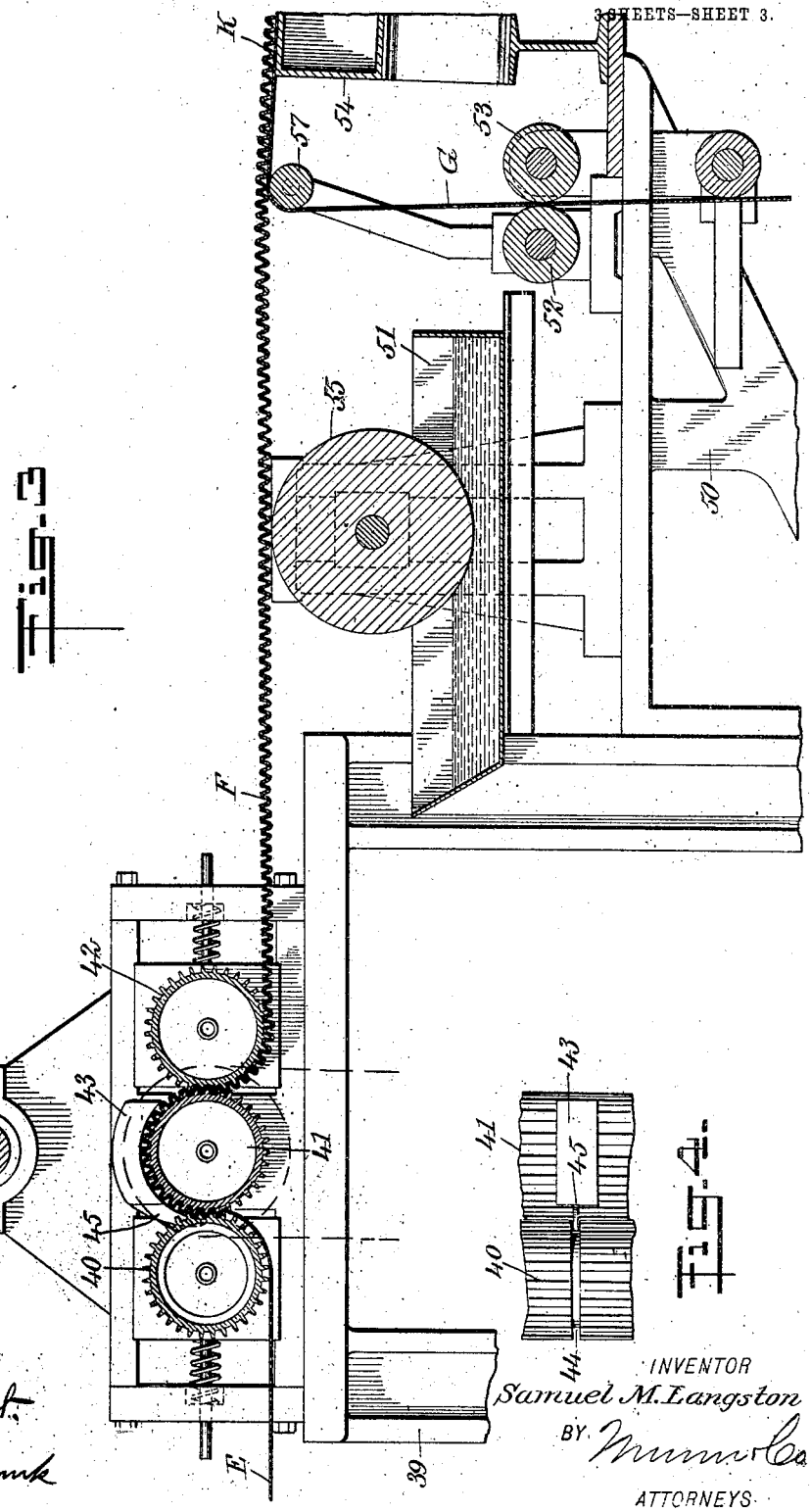

UNITED STATES PATENT OFFICE.

SAMUEL M. LANGSTON, OF CAMDEN, NEW JERSEY.

MACHINE FOR MAKING CELLULAR BOARDS.

No. 929,451.  Specification of Letters Patent.  Patented July 27, 1909.

Application filed November 20, 1908. Serial No. 463,573.

*To all whom it may concern:*

Be it known that I, SAMUEL M. LANGSTON, a citizen of the United States, and a resident of Camden, in the county of Camden and State of New Jersey, have invented a new and Improved Machine for Making Cellular Boards, of which the following is a full, clear, and exact description.

This invention relates to certain improvements in machines for making cellular board, and more particularly to that type of machine in which one sheet of material is corrugated and a second sheet is glued or pasted to the crowns of the corrugations of the first sheet. In my present construction, the machine is especially adapted for making asbestos board, and involves mechanism for pasting together two sheets, corrugating the combined sheets, heating them to dry the adhesive material and retain the corrugations in permanent form, and then securing a third sheet to the crowns of the corrugations of the double corrugated sheet.

The object of the invention is to provide a machine in which all of the operations necessary in the formation of single-faced cellular board may be carried out, and in which the relative speeds of the various parts may be suitably controlled.

Reference is to be had to the accompanying drawings forming a part of this specification, in which similar characters of reference indicate corresponding parts in all the figures, and in which—
Figure 1 is a side view of a complete machine constructed in accordance with my invention; Fig. 2 is a vertical longitudinal section of the upper portion of the left-hand end of the machine shown in Fig. 1; Fig. 3 is a section similar to Fig. 2, but showing the central portion of the machine; Fig. 4 is a detail view showing a portion of the corrugated rollers in top plan; Fig. 5 is a side elevation of the speed-changing gears shown in Fig. 2 but viewed from the opposite side, and Fig. 6 is a detail view showing in top plan a portion of the driving mechanism for the winding reels.

The special form of machine illustrated in the accompanying drawings is designed for forming a cellular board of asbestos, but the material need not necessarily be asbestos, for it is evident that the machine may be used for forming cellular board of any other suitable material. The corrugating rollers are adapted to run at uniform speed, and the speed of the feeding, pasting, and winding mechanisms may be varied in respect thereto, so that the depths of the corrugations may be varied and the continuity of the action maintained. The operation may be subdivided into three separate steps, namely, the pasting together of two sheets, the corrugating of the combined sheet resulting therefrom, and the applying of a third sheet to the crowns of the corrugations. The single machine carries on all of these separate steps successively.

For carrying on the first step of the operation, I have illustrated the machine as provided with a frame or standard 10, adapted to support a tank or tray 11 for the adhesive material. This adhesive material is preferably silicate of soda, but any other composition desired may be employed. Above the tank or tray is mounted a paste-applying roller 12, over which one sheet A of the material may pass, and this roller contacts with a transferring roller 13, the lower portion of which dips into the adhesive. The frame, at one side thereof, carries outwardly-extending arms 14 for supporting the roll B from which the sheet A is delivered, and the auxiliary frame which supports the pasting roller 12 may also support arms 15, having a roller 16 at their outer ends for resting directly upon the outer surface of the sheet A, intermediate the roll B and the paste-applying roller 12, so as to maintain the sheet substantially taut.

The frame or standard 10 carries a bracket or auxiliary frame 17 upon the side thereof opposite to the arms 14, and this auxiliary frame serves to support the mechanism for applying a second sheet C to the adhesive-covered surface of the sheet A, to feed the combined sheet and to support one end of a steam chest. The feeding mechanism includes two rollers 18 and 19, the former of which is mounted within bearings on the auxiliary frame 17 and the latter of which is carried by pivoted arms 20. The two arms are pivoted on a shaft, which also carries a roller 21, over which the second sheet C passes. The upper surface of the roller 21 is a slight distance below the under surface of the sheet A, so that the sheets A and C as they pass to the feed rollers 18 and 19, are closely adjacent each other. For varying the engagement of the feeding rollers 18 and 19 with the sheets A and C, so as to permit a slight slipping should occasion demand, one of the arms 20 is preferably provided with a rearwardly-extending arm 22 rigid therewith and having a depending rod 23, at its outer or free end. The rod is secured at its lower end to a foot lever 24, so constructed that by pressing upon said lever, the rod may be pulled downwardly and the roller 19 raised away from the roller 18. The sheet C may be delivered to the roller 21 from any suitable source below said roller, but preferably from a roll of material D, supported on small standards 25 adjacent the frame 10.

For driving the feeding rollers and the paste-applying rollers at the same speed, and for varying this speed, the auxiliary frame 17 carries at its outer end gear mechanism substantially as shown in Figs. 2 and 5. A shaft 26 is mounted in suitable bearings in the auxiliary frame, and this shaft is driven at constant speed by a chain 27. Upon the opposite end of the shaft from said chain there is mounted a gear wheel 28 and a plate 29 pivoted to rock upon said shaft as a center. The plate 29 carries two gear wheels 30 and 31, both of which are continuously in mesh with the gear wheel 28, and upon the stub shaft of each of these gear wheels 30 and 31, may be detachably secured pinions 32 and 33, respectively. On the shaft of the lower feed roller 18 is mounted a pinion 34, which may mesh with either the pinion 32 or the pinion 33. With the parts in the position indicated in Fig. 5, the gear 28, which rotates continuously at constant speed, drives the gear 31 and motion is transmitted from this gear to the lower feed roller through the pinions 33 and 34. The pinion 34 is of different size from the pinion 34, so that by rocking the plate, the pinion 33 may be brought out of engagement with the pinion 34 and the pinion 32 may be brought into engagement therewith. The feed rollers will then be rotated at a different speed, due to the difference in size of the pinions 32 and 33. These two last-mentioned pinions are preferably removable, so that larger or smaller ones may be substituted in place thereof and the feed rollers driven at any speed desired in respect to the constant speed of the gear 28. At the opposite end of the roller 18 from the pinion 34, there is mounted a sprocket wheel 35, and from this sprocket wheel a chain 36 transmits motion to a sprocket wheel 37 carried by a shaft 38 on the frame 10. Intermeshing gears on the shaft 38 and the shaft of the adhesive-feeding roller 13, serve to drive the latter at the same speed as the feeding rollers 18 and 19. It will thus be noted that the frame 10 supports the mechanism for carrying on the first step of the process. That is, coating one surface of the sheet of material with an adhesive, applying a second sheet thereto, feeding the combined sheet to the next portion of the apparatus, driving the feeding and adhesive-applying mechanism at the same speed, and varying said speed.

The second main step of the process consists in corrugating the combined sheets A and C, hereinafter referred to as the sheet E, and for accomplishing this, I provide a frame 39, supporting at its upper end three corrugating rollers 40, 41 and 42. The central one of these, 41, is mounted in suitable bearings, while the two outer ones 40 and 42 are mounted in bearings slidable in respect to the central corrugating roller, so that the teeth or corrugations of the rollers may intermesh at different distances to vary the extent of the corrugations produced. These rollers are all hollow, as are also their supporting shafts, and during the operation, steam is delivered from any suitable source to the interiors of the several rollers, to maintain them at a high temperature, and to thoroughly dry the material and harden and solidify the paste, or other adhesive, so that when the material leaves the corrugating rollers, the corrugations will be permanently retained. The rollers are so mounted that the sheet E first engages with the lower side of the roller 40 and passes upwardly between the rollers 40 and 41, follows the upper surface of the roller 41, passes downwardly between the rollers 41 and 42, and the complete corrugated sheet F leaves the lower side of the roller 42 in substantially the same plane as that of the uncorrugated sheet E. In order to insure the corrugated sheet following the upper surface of the roller 41, I provide one or more weights or guiding blocks 43, resting directly upon the upper surface of the material above the roller 41 and having the under surface curved to correspond with the curvature of the roller and the material. The roller 40 is provided with annular grooves 44 corresponding to the guiding blocks 43, and each guiding block carries a guiding finger or pointed projection 45 extending into the corresponding groove 44 and down through between the rollers a sufficient distance to insure the corrugated material following the roller 41 rather than the roller 40.

As the combined sheet E leaves the feeding rollers 18 and 19, the adhesive is still in a moist condition, while when the corrugated sheet F leaves the corrugating rollers, the adhesive material is thoroughly dried and hardened, and for aiding in the drying and hardening action, I preferably provide a steam chest 46, disposed intermediate the frames 17 and 39, and preferably supported thereby. The upper surface of this steam chest is in substantially the same plane as the line of intersection of the two feeding rollers, so that it receives the combined sheet E directly therefrom, and said steam chest terminates adjacent the frame 39, so that the combined sheet as soon as it leaves said steam chest, goes directly to the corrugating rollers. The length of the steam chest may be varied at will, depending upon the nature of the adhesive material employed, the time required to dry the adhesive, and the speed at which the machine is operated.

For driving the central corrugating roller 41 at a constant speed, I provide the shaft of said roller with a gear wheel 47, intermeshing with a pinion on a main drive shaft 48, disposed directly above said corrugating roller. Power may be delivered to this main shaft 48 from any suitable source, and from this shaft the entire machine is operated. The corrugating rollers 40 and 42 are not directly driven but are indirectly driven through their engagement with the central roller 41.

For transmitting motion to the gear wheel 28, I mount a shaft 49 in the lower portion of the frame 39 and directly drive this shaft from the shaft of the roller 41 by a chain 50. The shaft 49 carries not only the sprocket wheel for the chain 50, but also the sprocket wheel for the chain 27 leading to the shaft 26. Therefore, the corrugating rollers and the shaft 26 are driven at constant speed, while the adhesive-applying roller 13 and the feeding rollers 18 and 19 are driven at a speed variable in respect to the speed of the corrugating rollers, to provide for the formation of corrugations of different sizes.

The third main step of the process consists in applying adhesive to the crowns of the corrugations of the sheet F and applying to said crowns a third sheet G. For accomplishing this, the frame 39 carries an auxiliary frame 50, which serves to support a second tank or tray 51 for the adhesive material, feeding rollers 52 and 53 for the sheet G, and one end of a steam chest 54. The tank 51 is disposed below the level of the corrugating rollers and within the tank is mounted an adhesive-applying roller 55, the lower portion of which dips into the adhesive in the tank and the upper portion of which serves to support the corrugated sheet F and deliver adhesive to the crowns of the corrugations upon the under side thereof. A third roll of material H is mounted on suitable brackets 56 adjacent the frame 39, and the sheet G as it unrolls therefrom, passes between the feeding rollers 52 and 53, and thence over a supporting roller 57. This last-mentioned roller is adjacent the end of the steam chest 54, and its upper surface is substantially in alinement with the upper surface of the latter, so that as the sheet G passes over said roller 57, the corrugated sheet F coming from the roller 55, contacts directly with the upper surface of said sheet G, and the two are delivered together to the steam chest 54, which latter dries and hardens the adhesive and holds the two sheets together, to form the complete single-faced cellular board K. The feeding rollers 52 and 53 and the adhesive-applying roller 55 are driven at the same speed, but their speed may be varied in respect to the speed of the corrugating rollers. The roller 52 is driven by a chain 58, extending over a sprocket wheel 59, and the latter is driven from the adhesive-applying roller 55 by intermeshing gears, not shown. The shaft of the roller 55 carries a sprocket wheel 60, which is driven by a chain 61, leading from a sprocket on a shaft 62 journaled in the frame 39 adjacent its base. The shaft 62 is driven from the shaft 49 by a series of gears substantially the same as that shown in Fig. 5, and employed for transmitting motion from the shaft 26 to the roller 18. Inasmuch as the two motion-transmitting mechanisms are substantially identical, it is thought that the illustration of one of them is sufficient. As indicated in Fig. 1, the shaft 49 carries a plate 62ª, corresponding to the plate 29, and mounted on this plate are gear wheels 63 and 64, corresponding to the gear wheels 30 and 33, and by means of either of which motion may be transmitted to a pinion, not shown, on the shaft 62. Thus, the speed of the roller 55 and the feeding rollers 52 and 53 may be varied in respect to the corrugating rollers but their relative speeds cannot be varied.

Adjacent the outer end of the steam chest 54, there is mounted reel mechanism for winding the finished product. As illustrated, there are provided two separate reels 65 and 66, each having a sprocket wheel driven from a single chain 67, so that both reels rotate simultaneously in the same direction. These two reels are supported in a suitable bracket or frame 68, and the material may be delivered from the end of the steam chest 54 over a roller 69 to either reel. When a sufficient quantity has been accumulated on one reel, the material may be severed and started on the other reel without interrupting the continuous operation of the machine. The two reels are connected to their respective sprocket wheels by suitable friction clutches, whereby either one may be permitted to remain stationary. The chain 67 engages with not only the sprocket wheels on the reels 65 and 66, but also with a driving sprocket wheel 69ª. Secured to the sprocket wheel 69ª, is a second sprocket wheel 70, which is driven by a chain 71 extending longitudinally of the machine beneath the steam chest and over a sprocket wheel 72 on a shaft 73. On this shaft is a second sprocket wheel 74 driven by a chain 75 leading from a sprocket 76 on the main drive shaft 48. As it is necessary that the speed of the reel on which the material is being wound be varied continuously as the diameter of the roll of finished material increases, it is necessary that the reels be operated at a gradually decreasing speed. For accomplishing this, the sprocket wheel 72 is preferably loosely mounted on the shaft 73, so that it may turn in respect thereto, and keyed to the shaft upon opposite sides of said sprocket wheel are two friction disks 77 and 78. The former of these may be rigid in respect to the shaft, while the latter may be forced against the sprocket wheel 72 by a coil spring 79. The shaft 73 will be driven at constant speed, and as the roll of finished material increases, the speed of the latter may be decreased by the slipping of the sprocket wheel 72 between the two disks 77 and 78.

Having thus described my invention, I claim as new and desire to secure by Letters Patent:

1. In a machine of the class described, the combination of means for corrugating a sheet of material, means for feeding the material to the corrugating means, and connections whereby the relative speeds of the corrugating and feeding means may be varied.

2. In a machine of the class described, the combination of means for corrugating a sheet of material, means for feeding the material to said corrugating means, a drive shaft rotatable at constant speed, and means for driving both of the first-mentioned means from said drive shaft and varying their relative speeds.

3. In a machine of the class described, the combination of means for corrugating a sheet of material, means for feeding the material thereto, a drive shaft rotatable at constant speed, connections between said shaft and said corrugating means for driving the latter at constant speed, and connections between said drive shaft and said feeding means for varying the speed of the latter.

4. In a machine of the class described, the combination of means for applying an adhesive to a sheet of material, means for bringing a second sheet into engagement with the first-mentioned sheet, corrugating means, means for feeding the combined sheet to said corrugating means, and means for varying the relative speed of the corrugating means and the feeding means.

5. In a machine of the class described, in combination, means for applying an adhesive to a sheet of material, means for bringing a second sheet into engagement with the first-mentioned sheet, corrugating means, means for feeding the combined sheet to said corrugating means, and means for varying the relative speed of the adhesive applying means and the corrugating means.

6. In a machine of the class described, the combination of means for applying an adhesive to a sheet of material, means for bringing a second sheet into engagement with the first-mentioned sheet, corrugating means, means for feeding the combined sheet to said corrugating means, a drive shaft common to said corrugating means, adhesive applying means and feeding means, and connections whereby said corrugating means operates at constant speed, and whereby the speed of said adhesive applying means and said feeding means may be varied in respect thereto.

7. In a machine of the class described, the combination of means for corrugating a sheet of material, means for feeding said sheet to the corrugating means, means intermediate said feeding means and said corrugating means for heating the sheet, and means for varying the relative speeds of the feeding means and the corrugating means.

8. In a machine of the class described, corrugating rollers, feeding rollers delivering thereto, means for varying the speed of the feeding rollers in respect to the corrugating rollers, and means for temporarily separating said feeding rollers to render the same inoperative.

9. In a machine of the class described, the combination of two intermeshing corrugating rollers, one of said rollers having a groove therein, a weight in engagement with the other of said rollers, and guiding means carried by said weight and entering said groove for retaining the corrugated material in engagement with the other of said rollers during a portion of a revolution after it passes out of engagement with the first-mentioned roller.

10. In a machine of the class described, the combination of means for applying an adhesive to one surface of a sheet of material, means for pressing said sheet into engagement with a second sheet, a stationary steam chest over which the combined sheet may slide, and corrugating rollers adjacent the end of said steam chest for corrugating said combined sheet.

11. In a machine of the class described, the combination of means for applying an adhesive to one surface of a sheet of material, means for pressing said sheet into engagement with a second sheet, a stationary steam chest over which the combined sheet may slide and serving to partially dry the adhesive, corrugating rollers adjacent the end of said steam chest for corrugating said combined sheet, and means for internally heating said corrugating rollers to complete the drying action.

12. In a machine of the class described, the combination of means for applying an adhesive to one surface of a sheet of material, means for pressing said sheet into engagement with a second sheet, a stationary steam chest serving to support the combined sheets and over which they may slide to partially dry the adhesive, corrugating rollers adjacent the end of the steam chest for corrugating said combined sheet, means for internally heating said rollers to complete the drying action, means for applying an adhesive to the crowns of the corrugations, means for delivering a third sheet into engagement with said adhesive-covered crowns, and a second stationary steam chest serving to support the combined material as delivered from the last-mentioned means, and serving to dry the last-mentioned adhesive.

13. In a machine for making cellular board, the combination of means for adhesively securing together two sheets of material, a steam chest for supporting the two sheets and heating them to partially dry the adhesive, and means for corrugating the combined sheet and simultaneously heating the same to additionally dry the adhesive and retain the corrugations in permanent form.

14. In a machine for making cellular board, the combination of means for adhesively securing together two sheets of material, a steam chest for supporting the two sheets and heating them to partially dry the adhesive, means for corrugating the combined sheet and simultaneously heating the same to additionally dry the adhesive and retain the corrugations in permanent form, and means for adhesively securing a third sheet to the crowns of the corrugations of the combined sheet, and means for supporting and heating said third sheet to dry the adhesive last applied.

15. In a machine of the class described, the combination of corrugating rollers, a pair of feeding rollers delivering thereto, pivoted arms for supporting one of said feeding rollers, a lever connected to one of said arms, a link depending from said lever, and a foot lever connected to said link for swinging said arms and temporarily separating said feeding rollers to render the same inoperative.

In testimony whereof I have signed my name to this specification in the presence of two subscribing witnesses.

SAMUEL M. LANGSTON.

Witnesses:
CLAIR W. FAIRBANK,
PHILIP D. ROLLHAUS.